United States Patent
Van Bosch et al.

(10) Patent No.: US 6,693,535 B2
(45) Date of Patent: Feb. 17, 2004

(54) SYSTEM AND METHOD FOR CONTROLLING THE INTERIOR TEMPERATURE OF A VEHICLE

(75) Inventors: James A. Van Bosch, Crystal Lake, IL (US); Philip H. Burrus, Lilburn, GA (US); Nicholas C. Hopman, Lake Zurich, IL (US); Robert F. D'Avello, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 257 days.

(21) Appl. No.: 09/998,530

(22) Filed: Nov. 29, 2001

(65) Prior Publication Data

US 2003/0098784 A1 May 29, 2003

(51) Int. Cl.$^7$ ................................................. G08B 1/08
(52) U.S. Cl. .............................. 340/539.1; 340/426.25; 340/426.28; 307/10.2; 701/33
(58) Field of Search ........................ 340/426.25, 825.69, 340/825.72, 426.28, 539.1, 5.64; 307/10.2, 10.4, 10.5; 701/33, 35, 36, 29, 200

(56) References Cited

U.S. PATENT DOCUMENTS

| | | | |
|---|---|---|---|
| 4,879,553 A | * 11/1989 | Righi | 340/932.2 |
| 5,017,837 A | * 5/1991 | Hanna et al. | 315/136 |
| 5,331,307 A | * 7/1994 | Eizen | 340/426.24 |
| 5,552,790 A | * 9/1996 | Gunnarsson | 342/51 |
| 5,598,140 A | * 1/1997 | Eizen | 340/426.25 |
| 5,704,707 A | * 1/1998 | Gebelein et al. | 362/106 |
| 5,774,569 A | * 6/1998 | Waldenmaier | 382/100 |
| 5,782,020 A | * 7/1998 | Shumaker | 37/466 |
| 5,808,372 A | * 9/1998 | Schwegler et al. | 340/5.64 |
| 5,864,318 A | * 1/1999 | Cosenza et al. | 343/700 MS |
| 6,002,326 A | * 12/1999 | Turner | 340/426 |

* cited by examiner

Primary Examiner—Daryl Pope
(74) Attorney, Agent, or Firm—Steven A. May; Thomas V. Miller

(57) ABSTRACT

A passenger compartment monitoring and control system provides for remote control of an undesirable condition inside a vehicle. The passenger compartment monitoring and control system includes an undesirable condition sensor disposed in the interior of the car that detects the undesirable condition. In response to a signal from the sensor, a controller contained within the vehicle and operably coupled to the sensor generates at least one control signal based on the comparison. A wireless communication device operably coupled to the controller then transmits a wireless signal in response to the at least one control signal. The transmitted wireless signal may be received by a vehicle operator's mobile station or by a call center, which are each capable of then engaging in remedial actions to remotely ameliorate the undesirable condition.

35 Claims, 3 Drawing Sheets

SYSTEM AND METHOD FOR CONTROLLING THE INTERIOR TEMPERATURE OF A VEHICLE

FIELD OF THE INVENTION

The present invention relates generally to automotive detection and regulation systems and, in particular, to a wireless communication system operating in conjunction with an automotive detection and regulation system.

BACKGROUND OF THE INVENTION

Summer usually brings warmer temperatures to most regions of the United States and particularly in the South where temperature can become excessive. On a typical July day, it is not uncommon to see temperatures well above 100 degrees in the southern United States.

The interior of vehicles exposed to such climates can reach exceedingly high temperatures, which at times may become in excess of 280 degrees. In fact, even in milder climates, vehicle interiors can heat to unbearable levels where the outside temperature is not so excessive. A shaded, closed vehicle can reach 90 degrees in just five minutes, and 112 degrees in 25 minutes, when the outside temperature is only 78 degrees. In the sun, an vehicle interior can reach very high temperatures in a short amount of time, sometimes reaching a temperature of 200 degrees in just a few minutes. This phenomenon is the result of the infrared and ultraviolet light that penetrates an vehicle's windshield and windows. Instead of these light waves escaping or passing through the vehicle interior, they are reflected around throughout the vehicle causing or resulting in a tremendous temperature rise within the vehicle.

People are growing ever more health conscious. Numerous articles and television stories warn of leaving pets and children unattended in vehicles. There have recently been numerous reports of both pets and children, after being left in a closed vehicle on a sunny day, who have died from heat exposure. Dr. Erna Braun, a veterinarian, concluded: "Once an animal has been confined to a small space like an vehicle and the ambient temperature rises to 112 or 120 degrees, it is only a matter of minutes until the animal will succumb to heat exhaustion."

Modern automobiles manufactured today typically include a microprocessor. The microprocessor is responsible for obtaining data from various systems throughout the car, processing this data, and then activating and deactivating control systems. Fundamental systems run by the microprocessor include the catalytic converter and emissions control system, manifold temperature and pressure systems, fuel and oil pressure and control, and exhaust control. Other systems include speedometer, tachometer, transmission control, radio and air conditioning.

Companies such as Motorola have already developed advanced microprocessors specifically for automobiles. These advanced processors are capable of, in addition to the functions mentioned above, speech recognition, wireless communications and Internet access. These sophisticated processors have processing power to support real-time information, entertainment, communications and navigation applications for the car. In short, there is already a vast amount of processing power within an automobile and it will increase in the future.

What is lacking in the art is a combination of a temperature sensing and optional motion/occupant sensing system with the fundamental processing and control capability of the car's internal microprocessor in order to create a passenger compartment safety system. With the increased sophistication in today's automobiles, including split climate control, automatic anti-theft devices, global positioning systems and driving directions, this system is a natural extension that can reduce the health risk of remaining in a vehicle for extended periods of time and may even save both pet's and people's lives.

DETAILED DESCRIPTION OF THE INVENTION

To address the need for a combination of a temperature sensing and optional motion/occupant sensing system with the fundamental processing and control capability of the car's internal microprocessor in order to create a passenger compartment safety system, a passenger compartment monitoring and control system provides for remote control of an undesirable condition inside a vehicle. The passenger compartment monitoring and control system includes an undesirable condition sensor disposed in the interior of the car that detects the undesirable condition. In response to a signal from the sensor, a controller contained within the vehicle and operably coupled to the sensor generates at least one control signal based on the comparison. A wireless communication device operably coupled to the controller then transmits an wireless signal in response to the at least one control signal. The transmitted wireless signal may be received by a vehicle operator's mobile station or by a call center, which are each capable of then engaging in remedial actions to remotely ameliorate the undesirable condition.

Generally, one embodiment of the present invention encompasses a system for remote control of an undesirable condition inside a vehicle. The system includes an undesirable condition sensor disposed in the interior of the car, a controller operably coupled to the sensor, and a wireless communication device operably coupled to the controller. The sensor detects the undesirable condition. The controller, responsive to a signal from the sensor, compares the signal received from the sensor to a threshold and generates at least one control signal based on the comparison. The wireless communication transmits an wireless signal in response to the at least one control signal.

Another embodiment of the present invention encompasses a method for detecting and communicating an undesirable condition inside a vehicle when the vehicle is off. The method includes steps of sensing an undesirable condition in a passenger compartment of the vehicle through a sensor disposed in the interior of the vehicle, comparing the sensed interior condition to an interior threshold, and generating at least one control signal based on the comparison. The method further includes a step of transmitting a radio frequency signal in response to the at least one control signal.

Figure 1:
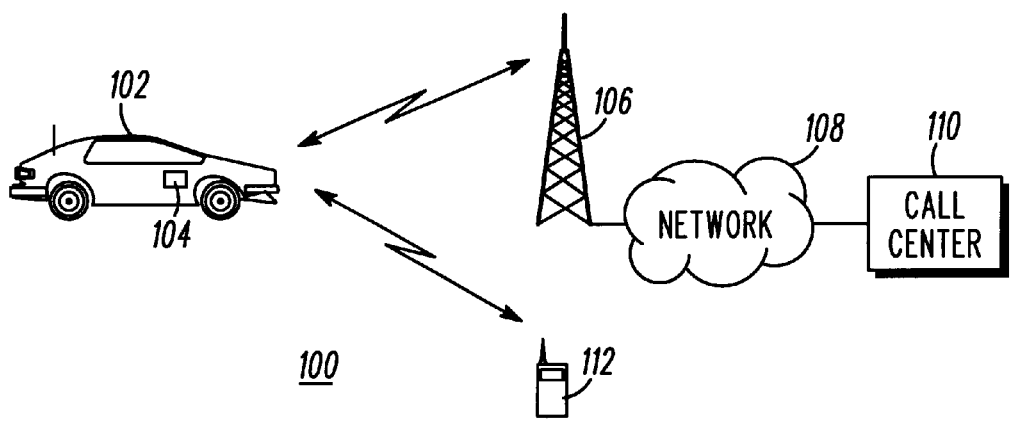
FIG. 1 is a block diagram of a wireless communication system in accordance with an embodiment of the present invention.

The present invention may be more fully described with reference to FIGS. 1–4. FIG. 1 is a block diagram of a wireless communication system 100 that provides wireless communication between passenger compartment monitoring and control system 104 in an automotive vehicle 102 and a remote transceiver. The remote transceiver can be any communication device capable of engaging in a wireless communication with vehicle 102, such as a base transceiver station (BTS) (not shown) included in a base site 106 or a mobile station (MS) 112, such as a pager, a cellular telephone, a radiotelephone, or a wireless modem coupled to a data processing device such as a personal computer (PC). Preferably the wireless communication is a radio frequency (RF) communication; however, those who are of ordinary skill in the art realize that the wireless communication may be any kind of wireless communication, such as an optical communication utilizing optical transmitters and receivers in the remote transceiver and in wireless communication devices 304, 320 in vehicle 102, without departing from the spirit and scope of the present invention.

A call center 110, preferably a telematics services provider that provides telematics services for automotive vehicles, such as OnStar® or ATX Technologies®, is capable of wirelessly communicating with vehicle 102 via a network 108, such as a Public Switched Telephone Network (PSTN) or the Internet, that connects the call center to base site 106.

Figure 2:
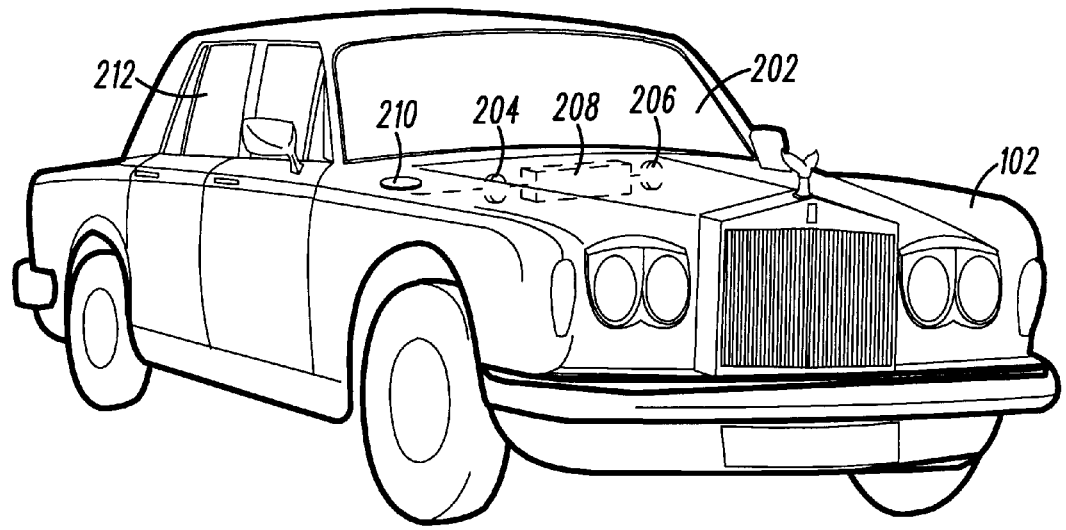
FIG. 2 is a representative view of an automotive vehicle of FIG. 1 in accordance with an embodiment of the present invention.

FIG. 2 is a representative view of vehicle 102 having a passenger compartment monitoring and control system 104 in accordance with an embodiment of the present invention. Passenger compartment monitoring and control system 104 includes a temperature sensor 204 and an occupancy detector 206 that are preferably located in a passenger compartment 202 of vehicle 102 and that are each operably coupled to a controller 208. Passenger compartment monitoring and control system 104 may further include a moisture sensor 210 disposed outside of the passenger compartment 202 and on the exterior surface of vehicle 102 that is also operably coupled to controller 208.

Temperature sensor 204 preferably is disposed in a location where a temperature within passenger compartment 202 can be accurately sensed. Occupancy detector 206 preferably is disposed in a location where a presence of a passenger in compartment 202 of vehicle 102 can be accurately detected. Occupancy detector 206 is used to determine whether a person or animal is present in passenger compartment 202, and may further determine a number of occupants of the passenger compartment. Controller 208, preferably a microprocessor, a microcontroller, or a digital signal processor (DSP), is preferably located in a dashboard unit (not shown) of vehicle 102 along with the other automotive electronics typically included in this portion of the vehicle. Controller 208 is capable of speech recognition, wireless communications, and wireless Internet access and includes processing power sufficient to support real-time information, entertainment, communications, and navigation applications for vehicle 102. Additional electronics (described below) are dispersed in the dashboard and/or within the engine compartment (not shown) to communicate with temperature sensor 204, occupancy detector 206, moisture sensor 210 and/or controller 208 to complete the system. Controller 208 associated with the system is preferably the primary processor that is already installed within vehicle 102.

Figure 3:
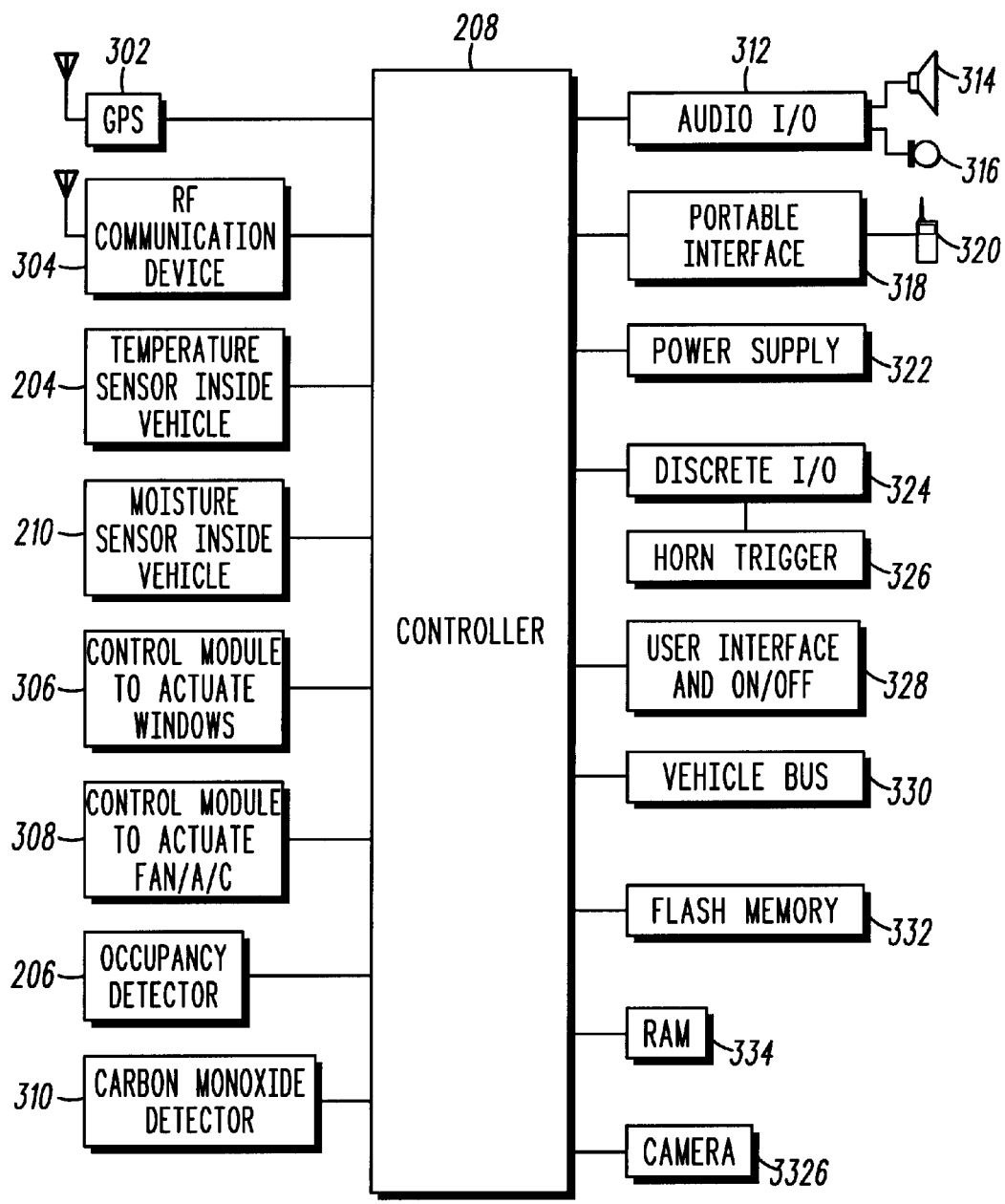
FIG. 3 is a block diagram of passenger compartment monitoring and control system of FIG. 1 in accordance with an embodiment of the present invention.

FIG. 3 is a block diagram of passenger compartment monitoring and control system 104 in accordance with an embodiment of the present invention. As shown in FIG. 3, passenger compartment monitoring and control system 104 includes a controller 208 operably coupled to each of a temperature sensor 204, occupancy detector 206 and moisture sensor 210. Passenger compartment monitoring and control system 104 further includes one or more memory devices 332, 334 (two shown) coupled to controller 208, such as a flash memory 332 and a random access memory (RAM) 334, for storing data, parameters, commands, information and user inputs. Any one or more of temperature sensor 204, occupancy detector 206, moisture sensor 210, and memory devices 332, 334, as other components 302–330 of system 104, may be coupled to controller 208 via a vehicle bus (not shown) or a device bus (not shown).

Temperature sensor 204, occupant detector 206, and moisture sensor 210 are each an analog or digital device that generates an electrical signal respectively proportional to the temperature within vehicle 102, motion within the vehicle, and moisture outside the vehicle. Detector 206 can take on many forms such as a motion sensor. Those who are of ordinary skill in the art realize that there are many means for sensing temperature (for example, the B05/07/10/14 series glass encapsulated Negative Temperature Coefficient (NTC) thermistors manufactured by Keystone Thermometrics), motion (for example the Leviton 25221 Occupancy sensor), and moisture (for example the FMC series moisture sensor, manufactured by Brookhuis) that may be used herein without departing from the spirit and scope of the present invention.

System 104 further includes two control modules operably coupled to controller 208, that is, a first control module 306 for actuating windows 212 of vehicle 102 and a second control module 308 for actuating a fan and air conditioning system (not shown) in vehicle 102. Control modules 306 and 308 preferably are variable ON/OFF drive mechanisms that are also well known in the art. Various control means include stepper motors, relays, switches, transistors, amplifiers, drive circuits and feedback circuits. A user interface 328 coupled to controller 208 provides a means by which a user can engage system 104, set and program system operating levels, and disable the system.

Passenger compartment monitoring and control system 104 further includes a Global Positioning System (GPS) unit 302 having a GPS receiver, a wireless communication device 304 that is affixed to the vehicle, a portable interface 318 for a coupling of a portable wireless communication device 320 to controller 208, and a power supply 322 that are each operably coupled to controller 208. GPS unit 302 is capable of receiving signals from a constellation of GPS satellites, thereby allowing controller 208 to determine the vehicle's location. Wireless communication devices 304 and 320 provide two-way wireless voice and data communications exchanges between system 104 and a remote transceiver, such as MS 112 or base site 106 and, via the base site, call center 110. As described above, wireless communication device 304 and portable wireless communication device 320 preferably are RF communication devices; however, those who are of ordinary skill in the art realize that wireless communication device 304 and portable wireless communication device 320 may be any kind of wireless communication device, such as an optical communication device, without departing from the spirit and scope of the present invention.

In one embodiment of the present invention, passenger compartment monitoring and control system 104 is always enabled, regardless of whether vehicle 102 is on or off. Passenger compartment monitoring and control system 104 has multiple modes, including a low power mode and a high power mode. When vehicle 102 is off and system 104 is not transmitting or receiving a wireless signal, the system resides in the low power mode. When wireless communication device 304 or 320 receives a wireless signal from a user of MS 112 or from call center 112, the wireless communication device conveys a power up message to controller 208 and controller 208 converts system 104 to the high power mode. Controller 208 also powers up system 104 when the controller determines to transmit a wireless signal to MS 112 or call center 110 as described below.

In another embodiment of the present invention, a system user, preferably an operator of vehicle 102, can enable system 104. In one embodiment, system 104 may be automatically engaged upon insertion of a key into a steering column ignition lock (not shown) in vehicle 102. Once engaged, controller 208 is programmed to query the user for certain inputs via user interface 328. For example, the user may be asked to input temperature levels or thresholds at which the system would activate, the distance the windows will roll down in response to certain other conditions, whether or not to page the user or place a telephone call to the user, the condition under which the fan and/or the air conditioner would come on and how long it should run, etc. Once the data has been input, controller 208 stores this information in memory 334 for future reference. Those of ordinary skill in the art realize that a memory device other than a RAM may be employed for this function without departing from the spirit and scope of the present invention.

In yet another embodiment of the present invention, system 104 may be programmed at the factory with default settings for the input parameters. As a result, system 104 may include a default mode where the user would not need to enter any data.

The user would simply arm or engage system 104 according to pre-programmed factory settings upon start-up of vehicle 102, and the system would use the factory default data during operation.

In still another embodiment of the present invention, a vehicle metrics device (not shown) is also coupled to controller 208. The vehicle metrics device is constructed from one or more sensors and is used to determine whether or not vehicle 102 is being operated by a driver, who is presumably in control of the cooling of the passenger compartment. Sensors may include a vehicle motion or speed sensor, a sensor detecting actuation of the steering wheel, brake pedal, transmission shifter, accelerator pedal, or any other sensor suitable for determining if the vehicle is being operated. System 104 may then self-engage when the system self-determines that vehicle 102 is not being operated by a driver.

When enabled, system 104 operates automatically, until disabled by the user, to monitor interior vehicle temperature sensed by temperature sensor 204 and passenger presence detected by occupancy detector 206. When an elevated interior temperature is detected by temperature sensor 204 and/or a pet or child that is left in the vehicle is detected by occupancy detector 206, such as by a movement of the person or animal or by infrared technology to detect a specific heat source, system 104 can take steps to reduce the interior temperature. Controller 208 can instruct one or more of control modules 306, 308, to control windows 212 and/or operate the fan/air conditioning unit. Controller 208 can also activate a vehicle horn (not shown) by activating a horn trigger 326 operably coupled to controller 208 via a discrete input/output (I/O) 324, or can transmit an alarm signal via an audio amplifier 314 coupled to controller 208 by an audio input/output (I/O) 312. Controller 208 may also initiate and engage in a wireless communication with MS 112 or with call center 110 via wireless communication device 304 and base site 106.

In one embodiment of the present invention, in the operation of system 104, the user may have programmed controller 208 so that the windows roll down one inch at 90 degrees, 2 inches at 112 degrees, and all the way down at 120 degrees. Further, the user may have programmed controller 208 for the air conditioning to come on if the temperature does not fall below 90 degrees with the windows all the way down. In another embodiment of the present invention, controller 208 can activate fan/air conditioning control module 308 and decrease interior temperature through the air conditioning system without accessing or opening the vehicle windows 212. The user may also desire to be paged or called, or that call center 110 be contacted, when the air conditioning comes on to ensure that the battery (not shown) does not die or to engage a back-up battery (not shown), or to be alerted that the windows to the vehicle are completed open. The user can program this information into the system through user interface 328, and system 104 then begins monitoring passenger compartment 202 through temperature sensor 204 and occupancy detector 206. System 104 can be disabled by the user preferably by an ON/OFF feature within user interface 328 located on the vehicle dashboard, or alternately by remote operation through wireless communication device 304 or 320. It is understandable that some users may be concerned about unauthorized access when windows 212 of vehicle 102 are rolled down. Another embodiment therefore may include only occupant detector 206 and temperature sensor 204 without window control module 306.

There are numerous ways that system 104 can notify a remote user or call center 110 that unsafe conditions exist in vehicle 102. In one embodiment of the present invention, occupant detector 206 and temperature sensor 204 may each convey a signal to controller 208. In response to receiving signals from occupant detector 206 and temperature sensor 204, controller 208 can initiate and engage in a wireless communication via wireless communication device 304 or 320, with MS 112 or with call center 110. Preferably, portable interface 318 includes a docking port for docking portable wireless communication device 320, such as a cellular telephone, a telematics unit, a personal digital assistant (PDA) with wireless capabilities, thereby coupling the portable wireless communication device to system 104. In other embodiments of the present invention, controller 208 may also activate the vehicle horn via discrete I/O 324 and horn trigger 326 or may also transmit an audio signal, such as a vehicle alarm, via audio I/O 312 and audio amplifier 314.

Figure 4:
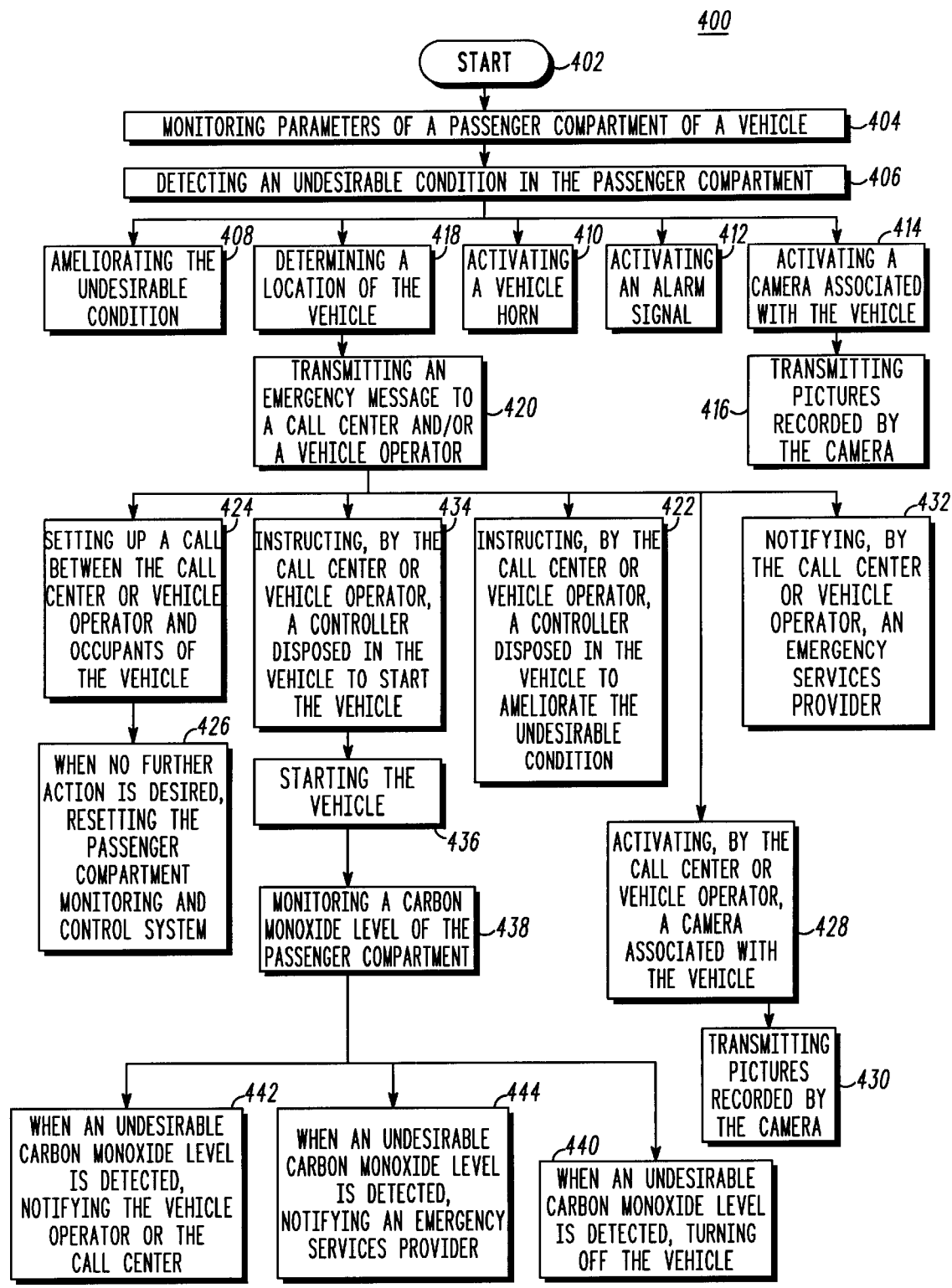
FIG. 4 is a flow chart of the steps executed by a passenger compartment monitoring and control system to monitor and control a condition of the passenger compartment in accordance with an embodiment of the present invention.

FIG. 4 is a logic flow diagram 400 of steps executed by passenger compartment monitoring and control system 104 to monitor and control parameters of passenger compartment 202 in accordance with an embodiment of the present invention. Preferably, the described steps are programmed into controller 208 and stored in memory device 332. Logic flow 400 begins (402) when passenger compartment monitoring and control system 104 monitors (404) parameters of passenger compartment 202. Preferably, temperature sensor 204 monitors a temperature of passenger compartment 202 and/or carbon monoxide sensor 310 monitors a carbon monoxide level of the compartment 202, and occupancy detector 206 monitors passenger compartment 102 for the presence of a passenger. In addition, system 104 may also monitor parameters external to passenger compartment 202, such as moisture sensor 210 monitoring the environment external to vehicle 102 for inclement weather. In one embodiment of the present invention, system 104 is always on, regardless of whether vehicle 102 is on or off. In another embodiment of the present invention, system 104 may be engaged by the system user via user interface 328 or may engage automatically. For example, system 104 may automatically engage upon insertion of a key into the steering column ignition lock of vehicle 102 or may automatically engage upon detecting that the user is no longer operating the vehicle or has left passenger compartment 202.

When an undesirable condition is detected (406), such as a predetermined, elevated temperature in passenger compartment 202 that is detected by temperature sensor 204 or a predetermined, elevated carbon monoxide level in passenger compartment 202 that is detected by a carbon monoxide sensor 310 disposed in the passenger compartment, system 104 engages in a course of action intended to remedy the undesirable condition. Preferably, controller 208 compares the detected temperature to a temperature threshold stored in memory device 332, or compares the detected carbon monoxide level to a carbon monoxide threshold stored in memory device 332, and determines that an undesirable condition exists based on the comparison, that is, when the detected temperature or carbon monoxide level exceeds the corresponding threshold. In another embodiment of the present invention, the undesirable condition may be a vehicle occupant, such as an animal or a child, left unattended in the passenger compartment and detected by occupancy detector 206 and relayed to controller 208. In yet other embodiments of the present invention, the undesirable condition may be a combination of any two or more of an excessive temperature, an excessive carbon monoxide level, and the presence of an unattended passenger in vehicle 102.

Upon detecting an undesirable condition, system 104 engages in remedial action. In one embodiment of the present invention, system 104, preferably controller 208, then ameliorates (408) the undesirable condition. The step of ameliorating (408) the undesirable condition may include controller 208 conveying a control signal to one or more of window control module 306 and fan/air conditioning control module 308 instructing the modules 306, 308 to roll down windows 212, activate a fan, or engage an air conditioning system. The step of ameliorating the undesirable condition may further include incrementally activating these systems, such as rolling down the windows, determining whether the temperature or carbon monoxide level is sufficiently reduced as a result and if not, then additionally, or alternatively, activating the fan, determining whether the temperature or carbon monoxide level is sufficiently reduced as a result of turning on the fan and if not then additionally, or alternatively, engaging the air conditioning system.

In another embodiment of the present invention, upon detecting an undesirable condition, system 104, preferably controller 208, provides remote notification of the undesirable condition. Controller 208 may activate (410) a vehicle horn via discrete I/O 324 and horn trigger 326 and/or may activate (412) a vehicle alarm that broadcasts an alarm signal via audio I/O 312 and audio amplifier 314. Controller 208 may also activate (414) a digital camera 336 operably coupled to controller 208. Camera 336 may be disposed in passenger compartment 202 of vehicle 102 in a manner that allows the camera to record pictures of the passenger compartment, or may be disposed in the interior, or affixed to an exterior, of the vehicle in a manner that allows the camera to record pictures of an exterior area proximate to the vehicle. Camera 336 may also be operably coupled to wireless communication device 304 or portable interface 318 via a bus, such as vehicle bus 330. In another embodiment of the present invention, camera 336 may be included in wireless communication device 304 or portable communication device 320, such as a digital cellular telephone with video conferencing capability. An exchange of data between camera 336 and wireless communication device 304 or portable interface 318 preferably is controlled by controller 208. When activated, camera 336 begins recording pictures of passenger compartment 202 or of the exterior area proximate to the vehicle, depending upon the disposition and orientation of the camera, which pictures are transmitted (416) by wireless communication device 304 or portable communication device 320, via portable interface 318, to call center 110 or MS 112.

In addition to, or in an alternative to, any one or more of the above steps (410)–(416), controller 208 may (420) notify call center 110 or MS 112 of an undesirable condition in vehicle 102 by transmitting a wireless emergency message via one or more of wireless communication devices 304 and 320. Call center 110 and/or MS 112 may be notified by voice, by transmission of circuit switched data, or by transmission of packet data. Preferably the emergency message indicates that an undesirable condition has been detected in vehicle 102. The emergency message may further include other pertinent information, such as the temperature of passenger compartment 202, the number of occupants of the passenger compartment, and a vehicle identification number (VIN) associated with vehicle 102. The system may further determine (418) a location of the vehicle, such as a location based on GPS information, and include the determined location in the emergency message.

Upon receiving the emergency message, call center 110 or a user of MS 112 may execute any one or more of the following steps to ameliorate the undesirable condition. Call center 110 or a user of MS 112 may transmit a wireless message to controller 208 instructing (422) the controller to reduce an interior temperature or carbon monoxide level of vehicle 102 by doing one or more of actuating windows 212, activating the fan/air conditioning unit, or may instruct the controller to activate the vehicle horn or transmit an alarm signal. Call center 110 or the user of MS 112 may also set up a call (424) with wireless communication device 304 or 320, and thereby with the occupants of vehicle 102, in accordance with well known call set up techniques. Call center 110 or the user of MS 112 may then engage in voice communication with the occupants of vehicle 102 via audio I/O 312, audio amplifier 314, and a microphone 316 coupled to the audio I/O. Call center 110 or the user of MS 112 may confirm the undesirable condition via a conversation with the occupants and, when no further action is desired, reset (426) passenger compartment monitoring and control system 104. Call center 110 or the user of MS 112 may also notify (432) an emergency services provider, such as a "911" system, and provide the emergency services provider with information concerning the conditions in vehicle 102 and the location of the vehicle.

Call center 110 or the user of MS 112 may also remotely activate (428) camera 336. Call center 110 or the user of MS 112 may transmit a wireless message to controller 208 instructing the controller to activate camera 336. In response to the message, controller 208 activates camera 336 and the camera begins recording pictures of passenger compartment 202, which pictures are transmitted (430) by wireless communication device 304 or portable communication device 320, via portable interface 318, to call center 110 or MS 112.

Call center 110 or the user of MS 112 may also transmit a wireless message to controller 208 instructing (434) the controller to start vehicle 102, in response to which the controller starts (436) the vehicle. When call center 110 or the user of MS 112 instructs controller 208 to start vehicle 102, controller 208 then begins monitoring (438) a carbon monoxide level of passenger compartment 202, if such monitoring has not already begun, via carbon monoxide sensor 310. When an undesirable carbon monoxide level is detected, controller 208 may then turn off (440) vehicle 102 and/or notify (442) call center 110 or the user of MS 112. For example, controller 208 may compare the detected carbon monoxide level to a carbon monoxide threshold stored in memory device 332 and determine that an undesirable condition exists based on the comparison, that is, when the detected carbon monoxide level exceeds the carbon monoxide threshold. Call center 110 or the user of MS 112 may also notify (444) an emergency services provider, such as a "911" system, and provide the emergency services provider with information concerning the conditions in vehicle 102 and the location of the vehicle.

Those of ordinary skill in the art realize that the method depicted in FIG. 4 can also be performed with minimum modifications in order to heat a vehicle passenger compartment 202 in excessively cold ambient or exterior conditions by engaging a heating apparatus (not shown) of vehicle 102 or take other similar actions along the lines described above without departing from the spirit and scope of the present invention.

In general, a passenger compartment monitoring and control system 104 is capable of monitoring an undesirable condition, such as an excessive temperature or carbon monoxide level, in passenger compartment 202 of vehicle 102 and wirelessly transmitting an emergency message that notifies of the undesirable condition and includes helpful information such as a vehicle identification number and a vehicle location. The emergency message may be received by a vehicle operator who has left the vehicle or a call center 112. The remote vehicle operator or call center is then capable of ameliorating the undesirable condition by contacting an emergency service provider or instructing passenger compartment monitoring and control system 104 to turn off the vehicle if the vehicle is on or to activate a vehicle horn, alarm system, window control, or fan/air conditioning control. Passenger compartment monitoring and control system 104 is further capable of locally remedying the undesirable condition by activating the vehicle horn, alarm system, window control, or fan/air conditioning control.

The system thus allows people running errands with pets or children in a vehicle to make brief stops without subjecting the animal or child to extreme temperatures. Also, florists, perishable goods businesses, delivery men, etc., could use system 104 to keep goods fresh throughout a delivery run or throughout the working day. Those of ordinary skill in the art realize that system 104 can be applied to any one of multiple transportation vehicles, such as automobiles, buses, and mini-vans, to help prevent children inside the vehicles from being harmed by prolonged exposure to excessive temperature or carbon monoxide levels. In case of rain, external moisture sensor 210 can detect inclement weather and controller 208 would be programmed to respond appropriately. Windows 212 may be opened a lesser amount, for example, or even closed if open at the time, if inclement weather is detected. With the increased sophistication in today's vehicles, including split climate control, automatic anti-theft, GPS and driving directions, etc., the system and method described above is a unique extension that may save both pet's and people's lives.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What we claim is:

1. A system for remote control of an undesirable climate condition inside a vehicle comprising:
    an occupancy detector that detects a presence of an occupant of the vehicle; an undesirable climate condition sensor disposed in the interior of the vehicle that detects the undesirable climate condition to the occupant of the vehicle;
    a controller contained within the vehicle and operably coupled to the sensor and the occupancy detector, the controller responsive to a signal from the sensor and operative to compare the signal received from the sensor to a threshold and generate at least one control signal based on the comparison; and
    a wireless communication device operably coupled to the controller operative to transmit a wireless signal in response to the at least one control signal.

2. The system of claim 1, wherein the system further comprises a camera operably coupled to each of the controller and the wireless communication device that records pictures and wherein the recorded pictures are transmitted by the wireless communication device.

3. The system of claim 1, further comprising at least one control module housed within the vehicle, the at least one control module responsive to the at least one control signal to ameliorate the undesirable climate condition.

4. The system of claim 1, wherein the undesirable climate condition sensor comprises a temperature sensor that detects a temperature of the interior of the vehicle.

5. The system of claim 1, further comprising a moisture sensor operably coupled to the controller, the moisture sensor operative to sense exterior moisture.

6. The system of claim 1, further comprising a user interface operably coupled to the controller that permits a vehicle operator to input parameters into the controller.

7. The system of claim 1, wherein the wireless signal comprises an emergency message that comprises a location of the vehicle.

8. The system of claim 7, wherein the emergency message further comprises a number of occupants of the vehicle.

9. The system of claim 1, wherein the wireless signal that is transmitted by the wireless communication device is received by a call center and wherein the controller is capable of ameliorating the undesirable climate condition in response to a wireless signal received from the call center.

10. The system of claim 1, wherein the wireless signal that is transmitted by the wireless communication device is received by a call center and wherein a call is set up with the call center in response to the wireless signal.

11. The system of claim 1, wherein the wireless signal that is transmitted by the wireless communication device is received by a vehicle operator who has left the vehicle and wherein the controller is capable of ameliorating the undesirable climate condition in response to a wireless signal received from the vehicle operator.

12. The system of claim 1, wherein the wireless signal that is transmitted by the wireless communication device is received by a vehicle operator and wherein a call is set up with the vehicle operator in response to the wireless signal.

13. The system of claim 1, wherein the wireless signal transmitted by the wireless communication device comprises a first wireless signal, wherein the wireless communication device receives a second wireless signal in response to transmitting the first wireless signal, and wherein the controller ameliorates the undesirable climate condition in response to the second wireless signal.

14. The system of claim 1, wherein the system further comprises a camera operably coupled to each of the controller and the wireless communication device, wherein the wireless signal transmitted by the wireless communication device comprises a first wireless signal, wherein the wireless communication device receives a second wireless signal in response to transmitting the first wireless signal, wherein the controller activates the camera in response to the second wireless signal, wherein the camera records pictures in response to being activated, and wherein the wireless communication device transmits the pictures recorded by the camera.

15. The system of claim 1, wherein the wireless signal transmitted by the wireless communication device comprises a first wireless signal, wherein the wireless communication device receives a second wireless signal in response to transmitting the first wireless signal, and wherein the controller starts up the vehicle in response to the second wireless signal.

16. The system of claim 15, wherein the sensor comprises a plurality of undesirable climate condition sensors and wherein an undesirable climate condition sensor of the plurality of undesirable climate condition sensors comprises a carbon monoxide sensor that monitors a carbon monoxide level of the interior of the car.

17. The system of claim 16, wherein the controller shuts off the vehicle in response to a detection of an undesirable carbon monoxide level by the carbon monoxide sensor.

18. A method for detecting and communicating an undesirable climate condition inside a vehicle when the vehicle is off, the method comprising steps of:
 detecting, by an occupancy detector, a presence of an occupant within the vehicle;
 sensing an undesirable climate condition in a passenger compartment of the vehicle through a sensor disposed in the interior of the vehicle;
 comparing the sensed interior condition to an interior threshold;
 generating at least one control signal based on the comparison and the detected presence of an occupant within the vehicle; and
 transmitting a wireless signal in response to the at least one control signal.

19. The method of claim 18, further comprising steps of:
 recording pictures of the passenger compartment; and
 wirelessly transmitting the recorded pictures.

20. The method of claim 18, further comprising steps of:
 recording pictures of an exterior area proximate to the vehicle; and
 wirelessly transmitting the recorded pictures.

21. The method of claim 18, further comprising a step of determining a location of the vehicle and wherein the wireless signal comprises the determined location.

22. The method of claim 18, further comprising a step of determining a number of occupants of the vehicle and wherein the wireless signal further comprises the number of occupants.

23. The method of claim 18, further comprising a step of setting up a call between a call center and vehicle occupants.

24. The method of claim 18, further comprising a step of ameliorating the undesirable climate condition in response to the at least one control signal.

25. The method of claim 18, wherein the step of sensing an undesirable climate condition in a passenger compartment of the vehicle comprises a step of detecting a temperature of the passenger compartment of the vehicle through a sensor disposed in the interior of the vehicle.

26. The method of claim 18, further comprising the step of sensing exterior moisture via a moisture sensor.

27. The method of claim 18, wherein the transmitted wireless signal comprises a first wireless signal, and further comprising a step of receiving a second wireless signal in response to transmitting the first wireless signal.

28. The method of claim 27, further comprising steps of:
 recording pictures of the interior of the vehicle in response to receiving the second wireless signal; and
 wirelessly transmitting the recorded pictures.

29. The method of claim 27, further comprising steps of:
 recording pictures of an exterior area proximate to the vehicle in response to receiving the second wireless signal; and
 wirelessly transmitting the recorded pictures.

30. The method of claim 27, further comprising a step of ameliorating the undesirable climate condition in response to receiving the second wireless signal.

31. The method of claim 27, further comprising a step of starting up the vehicle in response to receiving the second wireless signal.

32. The method of claim 31, wherein the undesirable climate condition is a carbon monoxide level and further comprising a step of monitoring the carbon monoxide level of the interior of the vehicle.

33. The method of claim 32, further comprising a step of shutting off the vehicle in response to a detection of an undesirable carbon monoxide level by the carbon monoxide sensor.

34. The method of claim 33, further comprising a step of, when an undesirable carbon monoxide level is detected, transmitting a wireless signal informing of the undesirable carbon monoxide level.

35. The method of claim 18, further comprising steps of:
 receiving the transmitted wireless signal; and
 notifying an emergency services provider in response to receiving the transmitted wireless signal.

* * * * *